(12) United States Patent
Ando (10) Patent No.: US 8,176,727 B2
(45) Date of Patent: May 15, 2012

(54) INTERNAL COMBUSTION ENGINE CONTROL APPARATUS AND CONTROL METHOD OF INTERNAL COMBUSTION ENGINE

(75) Inventor: Ikuo Ando, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 470 days.

(21) Appl. No.: 11/661,683

(22) PCT Filed: Oct. 1, 2004

(86) PCT No.: PCT/JP2004/014898
§ 371 (c)(1),
(2), (4) Date: Mar. 2, 2007

(87) PCT Pub. No.: WO2006/038306
PCT Pub. Date: Apr. 13, 2006

(65) Prior Publication Data
US 2008/0216465 A1    Sep. 11, 2008

(51) Int. Cl.
*F01N 3/00*    (2006.01)
(52) U.S. Cl. ............... 60/284; 60/274; 60/285; 60/295; 60/301
(58) Field of Classification Search ............ 60/274, 60/284–287, 295–301
See application file for complete search history.

(56) References Cited

U.S. PATENT DOCUMENTS

| | | | | |
|---|---|---|---|---|
| 5,497,745 A | * | 3/1996 | Cullen et al. | 123/339.11 |
| 5,619,852 A | * | 4/1997 | Uchikawa | 60/276 |
| 5,845,492 A | * | 12/1998 | Isobe et al. | 60/284 |
| 6,311,482 B1 | * | 11/2001 | Yamashita | 60/285 |
| 6,505,464 B1 | * | 1/2003 | Isobe et al. | 60/277 |
| 6,662,551 B2 | * | 12/2003 | Majima | 60/284 |
| 6,681,741 B2 | * | 1/2004 | Majima et al. | 123/399 |
| 7,168,238 B2 | * | 1/2007 | Wagner et al. | 60/284 |
| 7,284,367 B2 | * | 10/2007 | Hasegawa et al. | 60/284 |
| 7,293,406 B2 | * | 11/2007 | Lewis et al. | 60/284 |
| 2004/0163379 A1 | * | 8/2004 | Pott et al. | 60/284 |
| 2004/0182072 A1 | * | 9/2004 | Majima et al. | 60/285 |

FOREIGN PATENT DOCUMENTS

| | | | |
|---|---|---|---|
| JP | 01-190934 | | 8/1989 |
| JP | 08-086236 | | 4/1996 |
| JP | 08086236 A | * | 4/1996 |
| JP | 2514446 B2 | | 7/1996 |
| JP | 10-047119 A | | 2/1998 |
| JP | 2000257480 A | * | 9/2000 |
| JP | 2002-089339 A | | 3/2002 |
| JP | 2002089339 A | * | 3/2002 |

(Continued)

*Primary Examiner* — Thomas Denion
*Assistant Examiner* — Jesse Bogue
(74) *Attorney, Agent, or Firm* — Kenyon & Kenyon LLP (57) ABSTRACT

The internal combustion engine control apparatus of the invention starts gradually delaying an ignition timing θ for catalyst warm-up, immediately after a start of an internal combustion engine. When the ignition timing θ is delayed to or below a preset reference timing θref, a fuel amount increase flag F1 is set to 1 to start increase correction of a fuel injection amount. The internal combustion engine control apparatus then starts gradually increasing a throttle opening TH to a preset target opening THset. The increase correction of the fuel injection amount is terminated after elapse of a preset time t3 since the increase of the throttle opening TH to the preset target opening THset. This arrangement enables the increase correction of the fuel injection amount according to the requirement, thus improving the fuel economy and the emission.

17 Claims, 5 Drawing Sheets

FOREIGN PATENT DOCUMENTS

| | | |
|---|---|---|
| JP | 2002-213280 | 7/2002 |
| JP | 2002-213280 A | 7/2002 |
| JP | 2002213280 A * | 7/2002 |
| JP | 2002-266688 | 9/2002 |
| JP | 2002-257480 | 11/2002 |
| JP | 2003-074404 A | 3/2003 |
| JP | 2003-138960 | 5/2003 |
| JP | 03-546757 B2 | 7/2004 |
| JP | 03-552573 B2 | 8/2004 |

* cited by examiner

INTERNAL COMBUSTION ENGINE CONTROL APPARATUS AND CONTROL METHOD OF INTERNAL COMBUSTION ENGINE

This is a 371 national phase application of PCT/JP2004/014898 filed 01 Oct. 2004, the content of which is incorporated herein by reference.

TECHNICAL FIELD

The present invention relates to an internal combustion engine control apparatus and a control method of an internal combustion engine.

BACKGROUND ART

One proposed internal combustion engine control apparatus delays an ignition timing and performs increase correction of a fuel injection amount at a start of an internal combustion engine in a non-warm-up state, in order to accelerate the warm-up of en emission control catalyst, which is included in a catalytic converter for catalytic conversion of exhaust from the internal combustion engine (see, for example, Japanese Patent Laid-Open Gazette No. H08-86236). The increase correction of the fuel injection amount starts simultaneously with the start of delaying the ignition timing to prevent a potential misfire possibly caused by the delayed ignition timing and the lean condition of the air-fuel ratio possibly caused by the increased opening of an idling speed control valve. The increase correction of the fuel injection amount is terminated at the end of increasing the opening of the idling speed control valve. This control technique aims to prevent the lean condition of the air-fuel ratio and accelerate the catalyst warm-up. The high-speed catalyst warm-up enables the high-speed catalytic conversion of the exhaust from the internal combustion engine and improves the emission.

DISCLOSURE OF THE INVENTION

The catalyst warm-up at the start of the internal combustion engine is advantageous for the improved emission. The increase correction of the fuel injection amount performed at an inadequate timing may, however, worsen the fuel economy and cause the poor emission by the excessive fuel injection. It is thus highly demanded to start the increase correction of the fuel injection amount at an adequate timing and to terminate the increase correction of the fuel injection amount at an adequate timing.

In the internal combustion engine control apparatus of the invention and the corresponding internal combustion engine control method, there is a need of starting increase correction of a fuel injection amount at an optimum timing in the process of catalyst warm-up by a delay of an ignition timing on a start of an internal combustion engine in a non-warm-up condition. In the internal combustion engine control apparatus of the invention and the corresponding internal combustion engine control method, there is also a need of terminating the increase correction of the fuel injection amount at an optimum timing in the process of catalyst warm-up by the delay of the ignition timing on the start of the internal combustion engine in the non-warm-up condition.

In order to attain at least part of the above and the other related objects, the internal combustion engine control apparatus of the invention and the corresponding internal combustion engine control method have the configurations discussed below.

The present invention is directed to a first internal combustion engine control apparatus for controlling an internal combustion engine that has a variable ignition timing and is equipped with a catalytic converter, which is provided in an exhaust system and is filled with an emission control catalyst for catalytic conversion of exhaust from the internal combustion engine, the first internal combustion engine control apparatus performing start-time ignition control to start gradually delaying the ignition timing immediately after a start of the internal combustion engine with the emission control catalyst in a non-warm-up state, the first internal combustion engine control apparatus performing start-time fuel injection control, wherein until satisfaction of a predetermined amount increasing condition since the start of the gradual delay of the ignition timing by the start-time ignition control, the start-time fuel injection control regulates a fuel injection amount of a fuel injection valve to a specific amount of fuel injection for attaining a target air-fuel ratio, and after satisfaction of the predetermined amount increasing condition, the start-time fuel injection control starts increase correction of the fuel injection amount to increase the fuel injection amount of the fuel injection valve from the specific amount of fuel injection for attaining the target air-fuel ratio.

In the first internal combustion engine control apparatus of the invention, until satisfaction of the predetermined amount increasing condition since the start of the gradual delay of the ignition timing, the fuel injection valve is controlled to have the specific amount of fuel injection for attaining the target air-fuel ratio. After satisfaction of the predetermined amount increasing condition, the fuel injection valve is controlled to have the increased amount of fuel injection, which is higher than the specific amount of fuel injection for attaining the target air-fuel ratio. In the process of catalyst warm-up by the delay of the ignition timing, the increase correction of the fuel injection amount starts upon satisfaction of the predetermined amount increasing condition after the start of the delay of the ignition timing. This arrangement effectively improves the fuel economy at the start of the internal combustion engine and prevents the poor emission by the excessive fuel injection, compared with the increase correction of the fuel injection amount performed simultaneously with the start of the delay of the ignition timing. For example, the predetermined amount increasing condition may be that the ignition timing is delayed to a specific angle. In another example, the predetermined amount increasing condition may be that a preset time has elapsed since the start of the gradual delay of the ignition timing by the start-time ignition control. In one aspect of the invention, the 'specific amount of fuel injection for attaining the target air-fuel ratio' is computed by multiplying abase fuel injection amount for attaining a stoichiometric air-fuel ratio by a correction factor corresponding to an operating condition of the internal combustion engine.

In one preferable embodiment of the invention, the first internal combustion engine control apparatus performs start-time throttle control to start gradually increasing a throttle opening to a preset target opening after the start of the increase correction of the fuel injection amount by the start-time fuel injection control. The start-time fuel injection control terminates the increase correction of the fuel injection amount after the increase of the throttle opening to the preset target opening by the start-time throttle control. This arrangement desirably prevents the lean condition of the air-fuel ratio accompanied by the increased throttle opening and terminates the increase correction of the fuel injection amount in the end of the lean air-fuel ratio prevention control. The increased throttle opening increases the air intake flow and accelerates the catalyst warm-up. In one aspect of this first internal combustion engine control apparatus, the start-time fuel injection control terminates the increase correction of the fuel injection amount after elapse of a predetermined time since the increase of the throttle opening to the preset target opening. The predetermined time reflects a lowered air flow rate due to the increased throttle opening. In another aspect of this first internal combustion engine control apparatus, the start-time throttle control is cancelled in response to an output requirement to the internal combustion engine. The start-time fuel injection control terminates the increase correction of the fuel injection amount after elapse of a predetermined time since the start of the internal combustion engine, in the event of cancellation of the start-time throttle opening. The cancellation of the start-time throttle control loses the termination timing of the increase correction of the fuel injection amount. In this case, the increase correction of the fuel injection amount is terminated after elapse of the predetermined time since the start of the internal combustion engine. This arrangement desirably prevents the increase correction of the fuel injection amount from being continued without requirement.

In one aspect of the first internal combustion engine control apparatus, the start-time fuel injection control terminates the increase correction of the fuel injection amount after elapse of a predetermined time since the start of the internal combustion engine. This arrangement effectively prevents the increase correction of the fuel injection amount from being continued for an excessively long time period.

In another aspect of the first internal combustion engine control apparatus, the start-time fuel injection control terminates the increase correction of the fuel injection amount with a degree of attenuation based on a latest air-fuel ratio immediately before the termination of the start-time fuel injection control. This arrangement desirably prevents an abrupt change of the air-fuel ratio by the termination of the increase correction of the fuel injection amount.

The present invention is directed to a second internal combustion engine control apparatus for controlling an internal combustion engine that is equipped with a catalytic converter, which is provided in an exhaust system and is filled with an emission control catalyst for catalytic conversion of exhaust from the internal combustion engine, the second internal combustion engine control apparatus performing start-time throttle control at a first timing after a start of the internal combustion engine with the emission control catalyst in a non-warm-up state, where the start-time throttle control starts gradually increasing a throttle opening to a preset target opening, the second internal combustion engine control apparatus performing start-time fuel injection control at a second timing after the start of the internal combustion engine, where the start-time fuel injection control starts increase correction of a fuel injection amount to increase the fuel injection amount of a fuel injection valve from a specific amount of fuel injection for attaining a target air-fuel ratio, and the start-time fuel injection control terminates the increase correction of the fuel injection amount after the increase of the throttle opening to the preset target opening.

In the second internal combustion engine control apparatus of the invention, the start-time throttle control is performed at the first timing after the start of the internal combustion engine to start gradually increasing a throttle opening to the preset target opening. At the second timing after the start of the internal combustion engine, the increase correction of the fuel injection amount starts to control the fuel injection valve to have the increased amount of fuel injection, which is higher than the specific amount of fuel injection for attaining the target air-fuel ratio. The start-time fuel injection control terminates the increase correction of the fuel injection amount after the increase of the throttle opening to the preset target opening. The increased throttle opening increases the air intake flow and accelerates the catalyst warm-up. This arrangement desirably prevents the lean condition of the air-fuel ratio accompanied by the increased throttle opening and terminates the increase correction of the fuel injection amount in the end of the lean air-fuel ratio prevention control. The second internal combustion engine control apparatus ensures the adequate increase correction of the fuel injection amount, thus improving the fuel economy at the start of the internal combustion engine and preventing the poor emission by the excessive fuel injection.

In one aspect of the second internal combustion engine control apparatus, the start-time fuel injection control terminates the increase correction of the fuel injection amount after elapse of a predetermined time since the increase of the throttle opening to the preset target opening. The predetermined time reflects a lowered air flow rate due to the increased throttle opening. This arrangement ensures termination of the increase correction of the fuel injection amount at the adequate timing.

In another aspect of the second internal combustion engine control apparatus, the start-time throttle control is cancelled in response to an output requirement to the internal combustion engine. The start-time fuel injection control terminates the increase correction of the fuel injection amount after elapse of a predetermined time since the start of the internal combustion engine, in the event of cancellation of the start-time throttle opening. The cancellation of the start-time throttle control loses the termination timing of the increase correction of the fuel injection amount. In this case, the increase correction of the fuel injection amount is terminated after elapse of the predetermined time since the start of the internal combustion engine. This arrangement desirably prevents the increase correction of the fuel injection amount from being continued without requirement.

The present invention is directed to a control method of a first internal combustion engine for controlling an internal combustion engine that has a variable ignition timing and is equipped with a catalytic converter, which is provided in an exhaust system and is filled with an emission control catalyst for catalytic conversion of exhaust from the internal combustion engine, the control method of the first internal combustion engine performing start-time ignition control to start gradually delaying the ignition timing immediately after a start of the internal combustion engine with the emission control catalyst in a non-warm-up state, the control method of the first internal combustion engine performing start-time fuel injection control, wherein until satisfaction of a predetermined amount increasing condition since the start of the gradual delay of the ignition timing by the start-time ignition control, the start-time fuel injection control regulates a fuel injection amount of a fuel injection valve to a specific amount of fuel injection for attaining a target air-fuel ratio, and after satisfaction of the predetermined amount increasing condition, the start-time fuel injection control starts increase correction of the fuel injection amount to increase the fuel injection amount of the fuel injection valve from the specific amount of fuel injection for attaining the target air-fuel ratio.

In the control method of the first internal combustion engine of the invention, until satisfaction of the predetermined amount increasing condition since the start of the gradual delay of the ignition timing, the fuel injection valve is controlled to have the specific amount of fuel injection for attaining the target air-fuel ratio. After satisfaction of the predetermined amount increasing condition, the fuel injection valve is controlled to have the increased amount of fuel injection, which is higher than the specific amount of fuel injection for attaining the target air-fuel ratio. In the process of catalyst warm-up by the delay of the ignition timing, the increase correction of the fuel injection amount starts upon satisfaction of the predetermined amount increasing condition after the start of the delay of the ignition timing. This arrangement effectively improves the fuel economy at the start of the internal combustion engine and prevents the poor emission by the excessive fuel injection, compared with the increase correction of the fuel injection amount performed simultaneously with the start of the delay of the ignition timing.

In one preferable embodiment of the invention, the control method of the first internal combustion engine performs start-time throttle control to start gradually increasing a throttle opening to a preset target opening after the start of the increase correction of the fuel injection amount by the start-time fuel injection control. The start-time fuel injection control terminates the increase correction of the fuel injection amount after the increase of the throttle opening to the preset target opening by the start-time throttle control. This arrangement desirably prevents the lean condition of the air-fuel ratio accompanied by the increased throttle opening and terminates the increase correction of the fuel injection amount in the end of the lean air-fuel ratio prevention control. The increased throttle opening increases the air intake flow and accelerates the catalyst warm-up.

In one aspect of the control method of the first internal combustion engine, the start-time fuel injection control terminates the increase correction of the fuel injection amount after elapse of a predetermined time since the start of the internal combustion engine. This arrangement effectively prevents the increase correction of the fuel injection amount from being continued for an excessively long time period.

In another aspect of the control method of the first internal combustion engine, the start-time fuel injection control terminates the increase correction of the fuel injection amount with a degree of attenuation based on a latest air-fuel ratio immediately before the termination of the start-time fuel injection control. This arrangement desirably prevents an abrupt change of the air-fuel ratio by the termination of the increase correction of the fuel injection amount.

The present invention is directed to a control method of a second internal combustion engine for controlling an internal combustion engine that is equipped with a catalytic converter, which is provided in an exhaust system and is filled with an emission control catalyst for catalytic conversion of exhaust from the internal combustion engine, the control method of the second internal combustion engine performing start-time throttle control at a first timing after a start of the internal combustion engine with the emission control catalyst in a non-warm-up state, where the start-time throttle control starts gradually increasing a throttle opening to a preset target opening, the control method of the second internal combustion engine performing start-time fuel injection control at a second timing after the start of the internal combustion engine, where the start-time fuel injection control starts increase correction of a fuel injection amount to increase the fuel injection amount of a fuel injection valve from a specific amount of fuel injection for attaining a target air-fuel ratio, and the start-time fuel injection control terminates the increase correction of the fuel injection amount after the increase of the throttle opening to the preset target opening.

In the control method of the second internal combustion engine of the invention, the start-time throttle control is performed at the first timing after the start of the internal combustion engine to start gradually increasing a throttle opening to the preset target opening. At the second timing after the start of the internal combustion engine, the increase correction of the fuel injection amount starts to control the fuel injection valve to have the increased amount of fuel injection, which is higher than the specific amount of fuel injection for attaining the target air-fuel ratio. The start-time fuel injection control terminates the increase correction of the fuel injection amount after the increase of the throttle opening to the preset target opening. The increased throttle opening increases the air intake flow and accelerates the catalyst warm-up. This arrangement desirably prevents the lean condition of the air-fuel ratio accompanied by the increased throttle opening and terminates the increase correction of the fuel injection amount in the end of the lean air-fuel ratio prevention control. The control method of the second internal combustion engine ensures the adequate increase correction of the fuel injection amount, thus improving the fuel economy at the start of the internal combustion engine and preventing the poor emission by the excessive fuel injection.

In another aspect of the control method of the second internal combustion engine, the start-time throttle control is cancelled in response to an output requirement to the internal combustion engine. The start-time fuel injection control terminates the increase correction of the fuel injection amount after elapse of a predetermined time since the start of the internal combustion engine, in the event of cancellation of the start-time throttle opening. The cancellation of the start-time throttle control loses the termination timing of the increase correction of the fuel injection amount. In this case, the increase correction of the fuel injection amount is terminated after elapse of the predetermined time since the start of the internal combustion engine. This arrangement desirably prevents the increase correction of the fuel injection amount from being continued without requirement.

BEST MODES OF CARRYING OUT THE INVENTION

Figure 1:
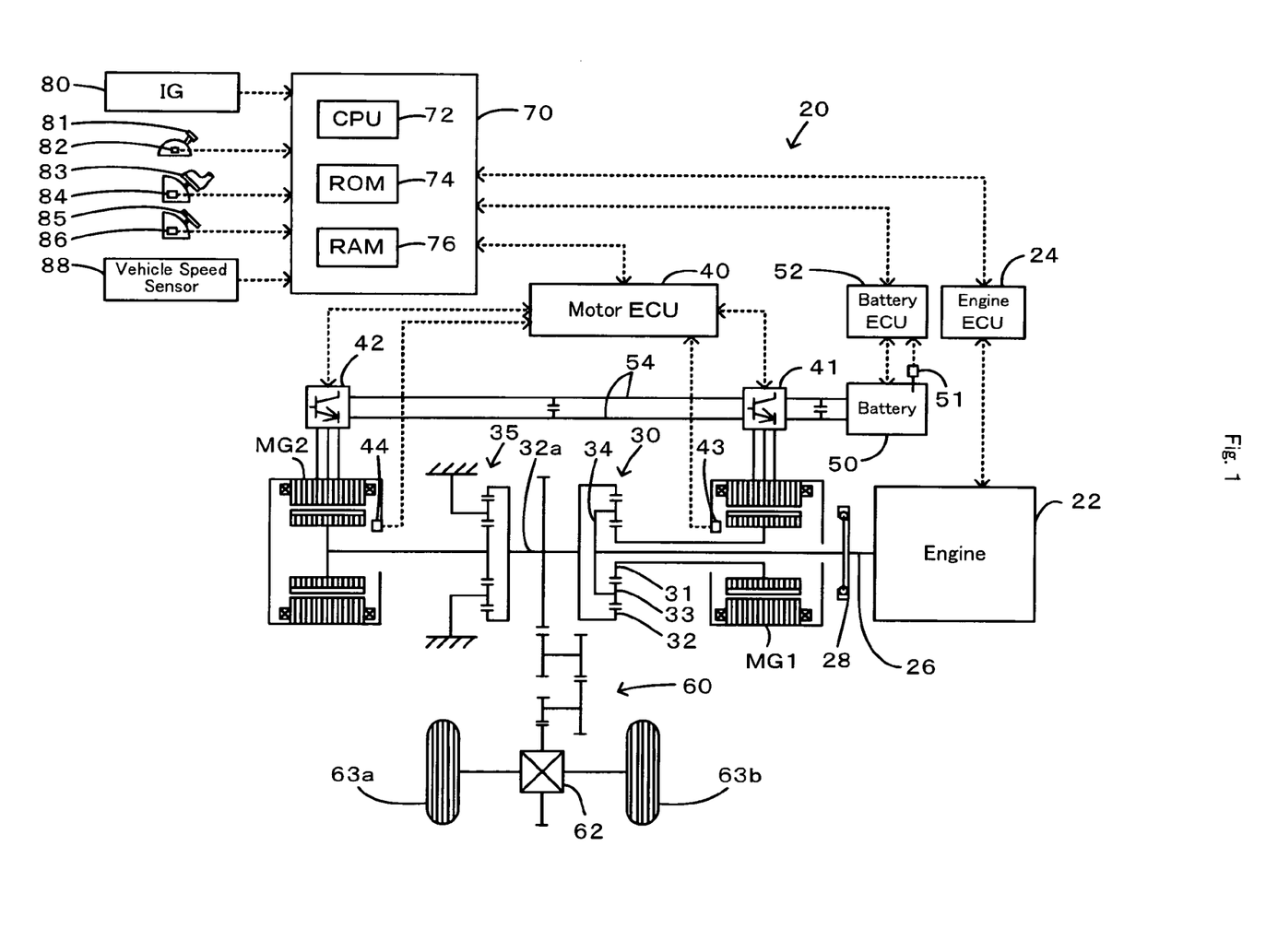
FIG. 1 schematically illustrates the configuration of a hybrid vehicle equipped with an internal combustion engine control apparatus in one embodiment of the invention.

One mode of carrying out the invention is discussed below as a preferred embodiment. FIG. 1 schematically illustrates the construction of a hybrid vehicle 20 with an internal combustion engine control apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

Figure 2:
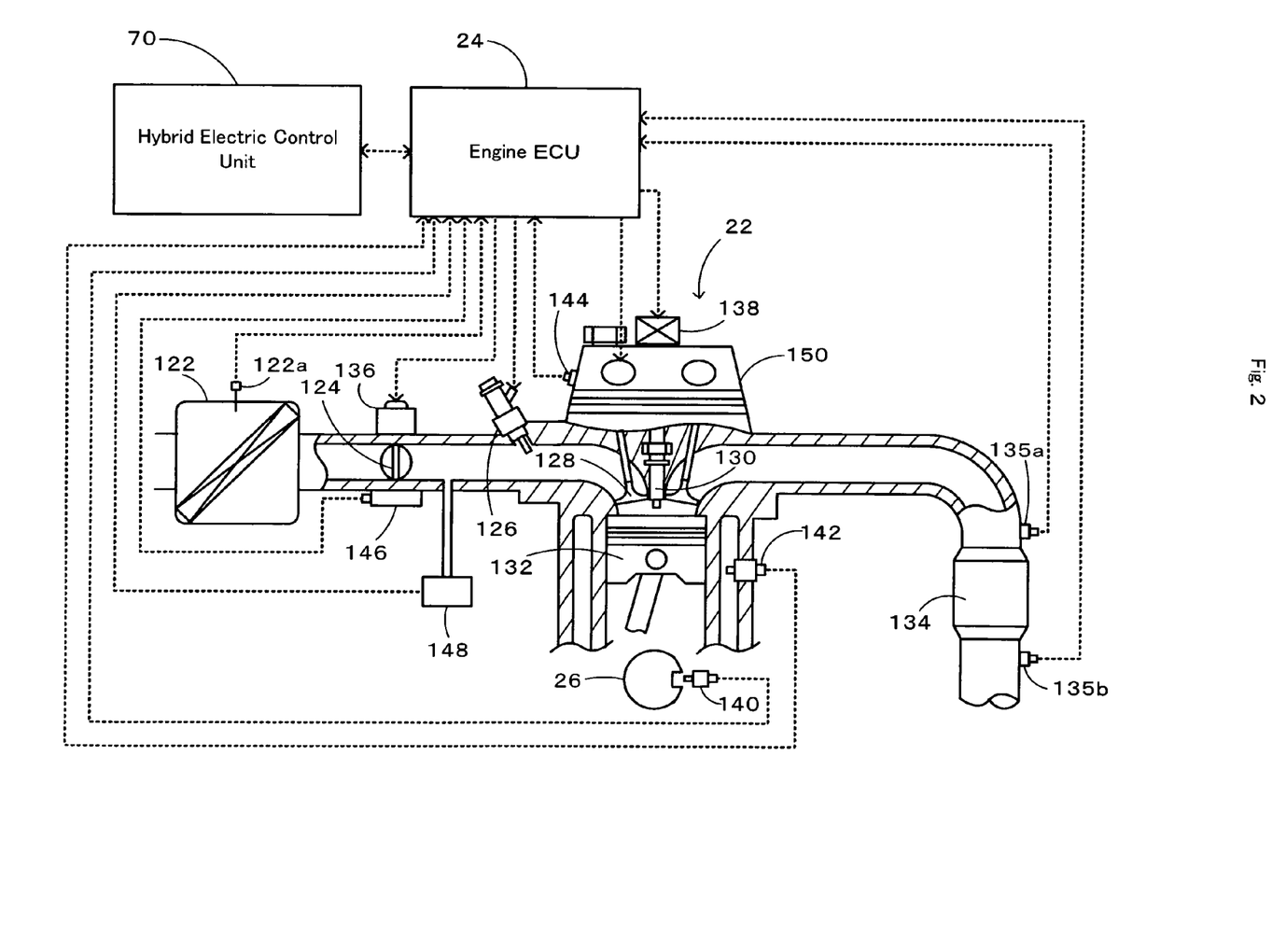
FIG. 2 schematically shows the structure of an engine mounted on the hybrid vehicle of the embodiment.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through a catalytic converter 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 receives, via its input port (not shown), signals from various sensors that measure and detect the conditions of the engine 22. The signals input into the engine ECU 24 via the input port include an intake air temperature Ta from a temperature sensor 122a attached to the air cleaner 122, a crank position from a crank position sensor 140 detected as the rotational position of the crankshaft 26, a cooling water temperature Tw from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an intake air flow Qa from a vacuum sensor 148 detected as the intake air flow as the load of the engine 22, an air-fuel ratio AF from an air-fuel ratio sensor 135a located upstream of the catalytic converter 134, and an oxygen signal from an oxygen sensor 135b located downstream of the catalytic converter 134. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 controls the operations of the engine 22 in response to control signals received from the hybrid electronic control unit 70, while outputting data regarding the driving conditions of the engine 22 to the hybrid electronic control unit 70 according to the requirements. The engine ECU 24 also computes a rotation speed Ne of the engine 22 from the crank position or rotational position of the crankshaft 26 detected by the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. The ring gear shaft 32a is linked to drive wheels 63a and 63b of the hybrid vehicle 20 via a gear mechanism 60 and a differential gear 62.

The motors MG1 and MG2 are constructed as known synchronous motor generators that may be actuated both as a generator and as a motor. The motors MG1 and MG2 are connected with a battery 50 via respective inverters 41 and 42 on power lines 54. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
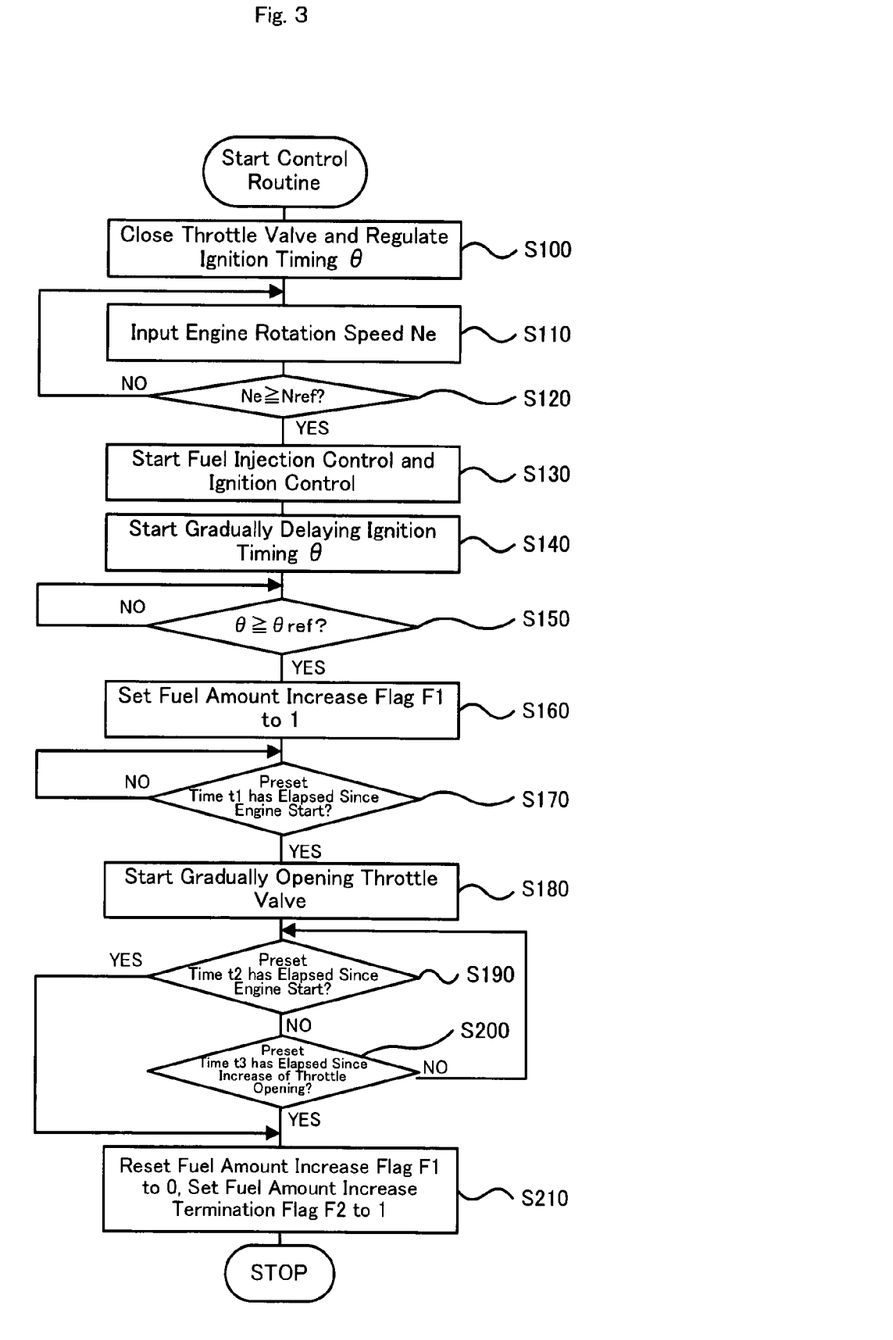
FIG. 3 is a flowchart showing a start control routine executed by an engine ECU in the hybrid vehicle of the embodiment.

The description regards the operations of the hybrid vehicle 20 of the embodiment having the configuration discussed above, especially a series of operation control for the first start of the engine 22 on the system activation of the hybrid vehicle 20. On a start of the engine 22 during a drive of the hybrid vehicle 20 in the motor drive mode, the motor MG1 is controlled to output a motoring torque for motoring the engine 22 via the power distribution integration mechanism 30. The motor MG2 is controlled to ensure output of the sum of a cancellation torque and a torque demand to the ring gear shaft 32a. The cancellation torque cancels out an output torque to the ring gear shaft 32a via the power distribution integration mechanism 30 on the occasion of motoring the engine 22. The torque demand is set in response to the driver's depression of the accelerator pedal 83 as a requirement to be output to the ring gear shaft 32a. FIG. 3 is a flowchart showing a start control routine executed by the engine ECU 24 at the start of motoring of the engine 22 by means of the motors MG1 and MG2.

In the start control routine, the engine ECU 24 first actuates the throttle motor 136 to close the throttle valve 124 for reduction of a throttle opening TH to a slightly smaller value than the opening under the idling drive condition, and regulates an ignition timing $\theta$ of the spark plug 130 to a predetermined start ignition timing $\theta$st (step S100). The start ignition timing $\theta$st is experimentally or otherwise determined as an ignition timing having a high potential for initial explosion of the engine 22. The engine ECU 24 waits until the input rotation speed Ne of the engine 22 reaches or exceeds a preset reference speed Nref (steps S110 and S120) and starts fuel injection control and ignition control to control the fuel injection from the fuel injection valve 126 and the ignition with the spark plug 130 (step S130). The engine ECU 24 then starts gradual delay of the ignition timing $\theta$ of the spark plug 130 to quickly warm up the catalyst included in the catalytic converter 134 (step S140). The delayed ignition timing $\theta$ of the spark plug 130 leads to combustion of the air-fuel mixture in the engine 22 at a later timing, compared with the combustion timing determined by the ordinary ignition timing. The exhaust of relatively high temperature is thus supplied to the catalytic converter 134 to quickly warm up the catalyst included in the catalytic converter 134. The abrupt delay of the ignition timing $\theta$ may cause a misfire. The start control of this embodiment gradually delays the ignition timing $\theta$ of the spark plug 130 to prevent such a potential misfire. The ignition control thus gradually delays the ignition timing $\theta$ of the spark plug 130 while checking for no occurrence of a misfire (that is, checking for smooth combustion).

When the ignition timing $\theta$ is delayed to or below a preset reference timing $\theta$ref (step S150), a fuel amount increase flag F1 is set to 1 (step S160). The delayed ignition timing $\theta$ increases the potential for a misfire. The increase correction of the fuel injection amount from the fuel injection valve 126 is thus performed to prevent the potential misfire. The details of the fuel injection control will be described later.

The engine ECU 24 waits until elapse of a preset time t1 since the start of the engine 22 (step S170) and starts gradually opening the throttle valve 124 to increase the throttle opening TH to a preset target opening THset for catalyst warm-up (step S180). The throttle opening TH is widened to increase the intake air flow and attain the quicker warm-up of the catalyst included in the catalytic converter 134. The combination of the increased intake air flow with the delayed ignition timing $\theta$ attains the quick warm-up of the catalyst included in the catalytic converter 134. In the embodiment hereof, this series of control process is called catalyst warm-up control.

When a preset time t2 has elapsed since the start of the engine 22 (step S190) or when a preset time t3 has elapsed since the increase of the throttle opening TH to the preset target opening THset (step S200), the engine ECU 24 resets the fuel amount increase flag F1 to 0 and sets a fuel amount increase stop flag F2 to 1 (step S210). Such settings of the flags F1 and F2 terminate the increase correction of the fuel injection amount. The engine ECU 24 then exits from the start control routine of FIG. 3. In the ordinary state that allows execution of the catalyst warm-up control during the drive of the hybrid vehicle 20 in the motor drive mode, the elapse timing of the preset time t3 since the increase of the throttle opening TH to the preset target opening THset comes earlier than the elapse timing of the preset time t2 since the start of the engine 22. In the ordinary state, the engine ECU 24 accordingly resets the fuel amount increase flag F1 to 0 and sets the fuel amount increase stop flag F2 to 1 at the timing when the preset time t3 has elapsed since the increase of the throttle opening TH to the preset target opening THset. The wait for elapse of the preset time t3 since the increase of the throttle opening TH to the preset target opening THset takes into account a time lag between the increase of the throttle opening TH and the actual increase of the intake air flow. The increase correction of the fuel injection amount is terminated after the increase of the throttle opening TH to the preset target opening THset. This is because termination of the increase of the throttle opening TH ends up the phenomenon of the lean air-fuel ratio AF occurring in the condition of the increased throttle opening TH. This arrangement does not continue the increase correction of the fuel injection amount without requirement but immediately cancels the increase correction. In the extraordinary state that does not allow execution of the catalyst warm-up control during the drive of the hybrid vehicle 20 in the motor drive mode, on the other hand, the start control cancels the catalyst warm-up control of gradually delaying the ignition timing θ and gradually increasing the intake air flow. The hybrid vehicle 20 falls in the extraordinary state, for example, in response to the driver's heavy depression of the accelerator pedal 83 during the catalyst warm-up control or in response to a significant increase of the vehicle speed V during the catalyst warm-up control to require the output power from the engine 22. The cancellation of the catalyst warm-up control stops the increase of the throttle opening TH. It is thus meaningless to wait until elapse of the preset time t3 since the increase of the throttle opening TH to the preset target opening THset. Namely it is impractical to terminate the increase correction of the fuel injection amount at this elapse timing in the extraordinary state. By taking into account the phenomenon in this extraordinary state, the start control process of this embodiment terminates the increase correction of the fuel injection amount after the elapse of the preset time t2 since the start of the engine 22. Such arrangement effectively prevents the increase correction of the fuel injection amount from being continued for a long time without requirement.

Figure 4:
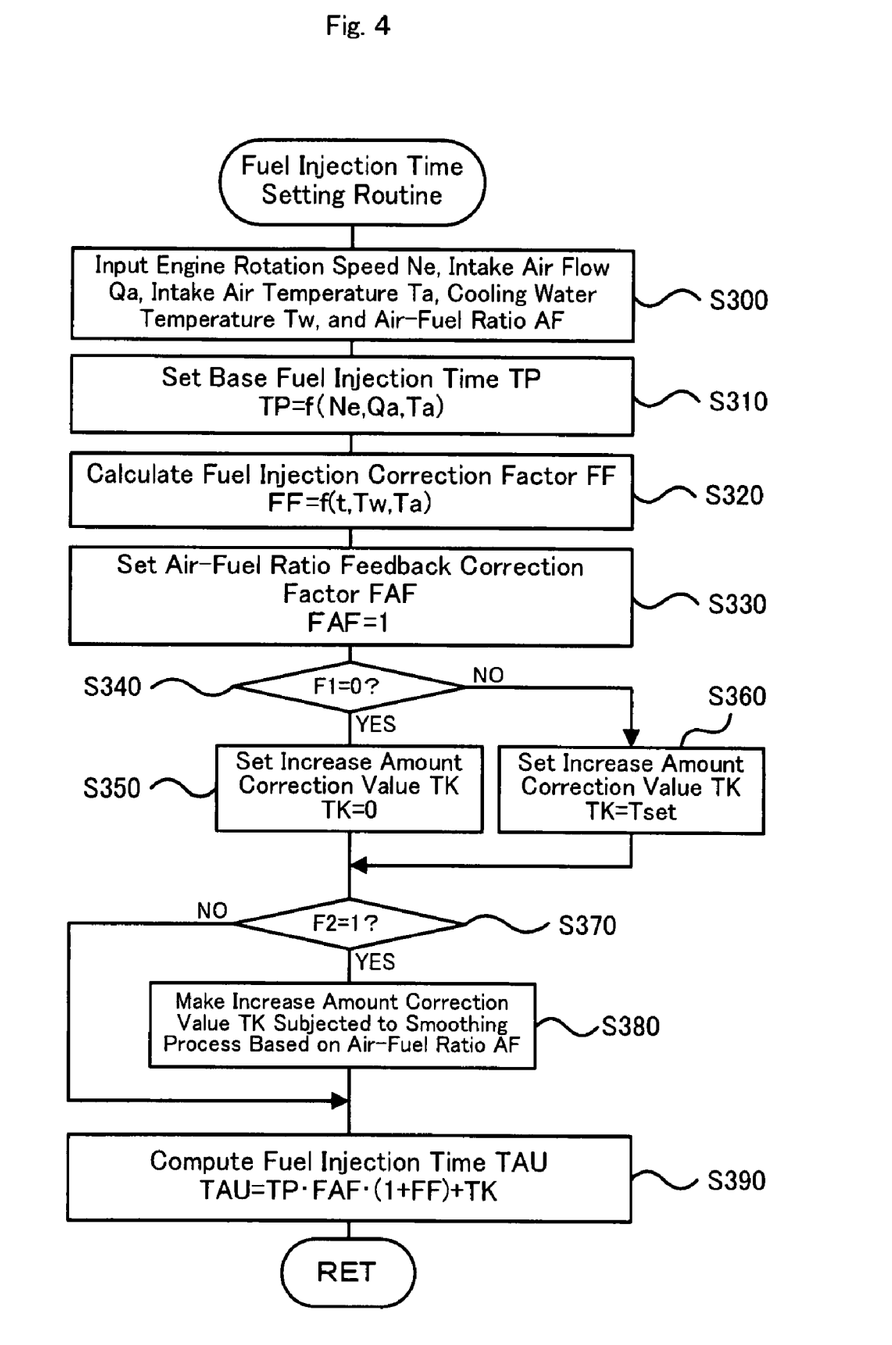
FIG. 4 is a flowchart showing a fuel injection time setting routine executed by the engine ECU.

The fuel injection control at the engine start time is described in detail. FIG. 4 is a flowchart showing a fuel injection time setting routine executed by the engine ECU 24 at the start of the engine 22. This fuel injection time setting routine is executed repeatedly as an interrupt process during execution of the start control routine of FIG. 3.

In the fuel injection time setting routine, the engine ECU 24 first inputs various data required for the fuel injection control, for example, the rotation speed Ne of the engine 22, the intake air flow Qa from the vacuum sensor 148, the intake air temperature Ta from the temperature sensor 122*a*, the cooling water temperature Tw from the water temperature sensor 142, and the air-fuel ratio AF from the air-fuel ratio sensor 135*a* (step S300). A base fuel injection time TP is set corresponding to the input rotation speed Ne of the engine 22, the input intake air flow Qa, and the input intake air temperature Ta (step S310). The base fuel injection time TP is set to attain the stoichiometric air-fuel ratio.

A fuel injection correction factor FF is calculated from an elapse of time 't' since the start of the fuel injection control, the input cooling water temperature Tw, and the input intake air temperature Ta (step S320). The fuel injection correction factor FF is given, for example, as the sum of two time coefficients, a water temperature coefficient, and an intake air temperature coefficient. The two time coefficients attenuate against the elapse of time 't' at different degrees of attenuation. The water temperature coefficient attenuates with an increase in cooling water temperature Tw. The intake air temperature coefficient reflects the temperature difference between a preset reference temperature (for example, 25° C.) and the intake air temperature Ta. In this embodiment, the calculated fuel injection correction factor FF is to be sufficiently small relative to a reference value '1' and has the absolute value of, for example, not greater than 0.3.

An air-fuel ratio feedback correction factor FAF is then set to 1 (step S330). The air-fuel ratio feedback correction factor FAF is used to correct a deviation of the air-fuel ratio AF measured by the air-fuel ratio sensor 135*a* from a target air-fuel ratio (for example, the stoichiometric air-fuel ratio). When the fuel amount increase flag F1 is equal to 0 (step S340: yes), an amount increase correction value TK is set to 0 (step S350). When the fuel amount increase flag F1 is equal to 1 (step S340: no), on the other hand, the amount increase correction value TK is set to a specified amount increase time Tset (step S360). After setting the amount increase correction value TK at either step S350 or step S360, the engine ECU 24 identifies whether the fuel amount increase termination flag F2 is equal to 1 (step S370). When the fuel amount increase termination flag F2 is identified as 0 (step S370: no), a fuel injection time TAU is calculated from the set base fuel injection time TP, the set fuel injection correction factor FF, the set air-fuel ratio feedback control factor FAF, and the set amount increase correction value TK according to Equation (1) given below (step S390):

$$TAU=TP \cdot FAF \cdot (1+FF)+TK \qquad (1)$$

After calculation of the fuel injection time TAU at step S390, the engine ECU 24 exits from this fuel injection time setting routine. When both the fuel amount increase flag F1 and the fuel amount increase termination flag F2 are reset to 0, the amount increase correction value TK is set equal to 0. There is accordingly no increase correction of the fuel injection amount. When the fuel amount increase flag F1 is set to 1 and the fuel amount increase termination flag F2 is reset to 0, the amount increase correction value TK is set to the specified amount increase time Tset. The increase correction of the fuel injection amount is accordingly performed with this setting of the amount increase correction value TK. The specified amount increase time Tset may be an increment of the fuel injection time required for prevention of a potential misfire occurring in the condition of the delayed ignition timing θ or may be an increment of the fuel injection time required for prevention of a potential misfire occurring in the condition of the increased throttle opening TH.

When the fuel amount increase termination flag F2 is identified as 1 (step S370: yes), on the other hand, the increase amount correction value TK is subjected to a smoothing process based on the air-fuel ratio AF (step S380). The fuel injection time TAU is calculated from the smoothed increase amount correction value TK according to Equation (1) given above (step S390). After calculation of the fuel injection time TAU at step S390, the engine ECU 24 exits from this fuel injection time setting routine. The smoothing process based on the air-fuel ratio AF sets a smaller value to a smoothing degree in the condition of rich air-fuel ratio AF to attain a quick approach of the increase amount correction value TK to 0, while setting a greater value to the smoothing degree in the condition of lean air-fuel ratio AF to attain a slow approach of the increase amount correction value TK to 0. This arrangement effectively prevents a significant variation in air-fuel ratio AF accompanied with an abrupt change in amount of fuel injection by the termination of the increase correction of the fuel injection amount, thus ensuring stable fuel injection control.

Figure 5:
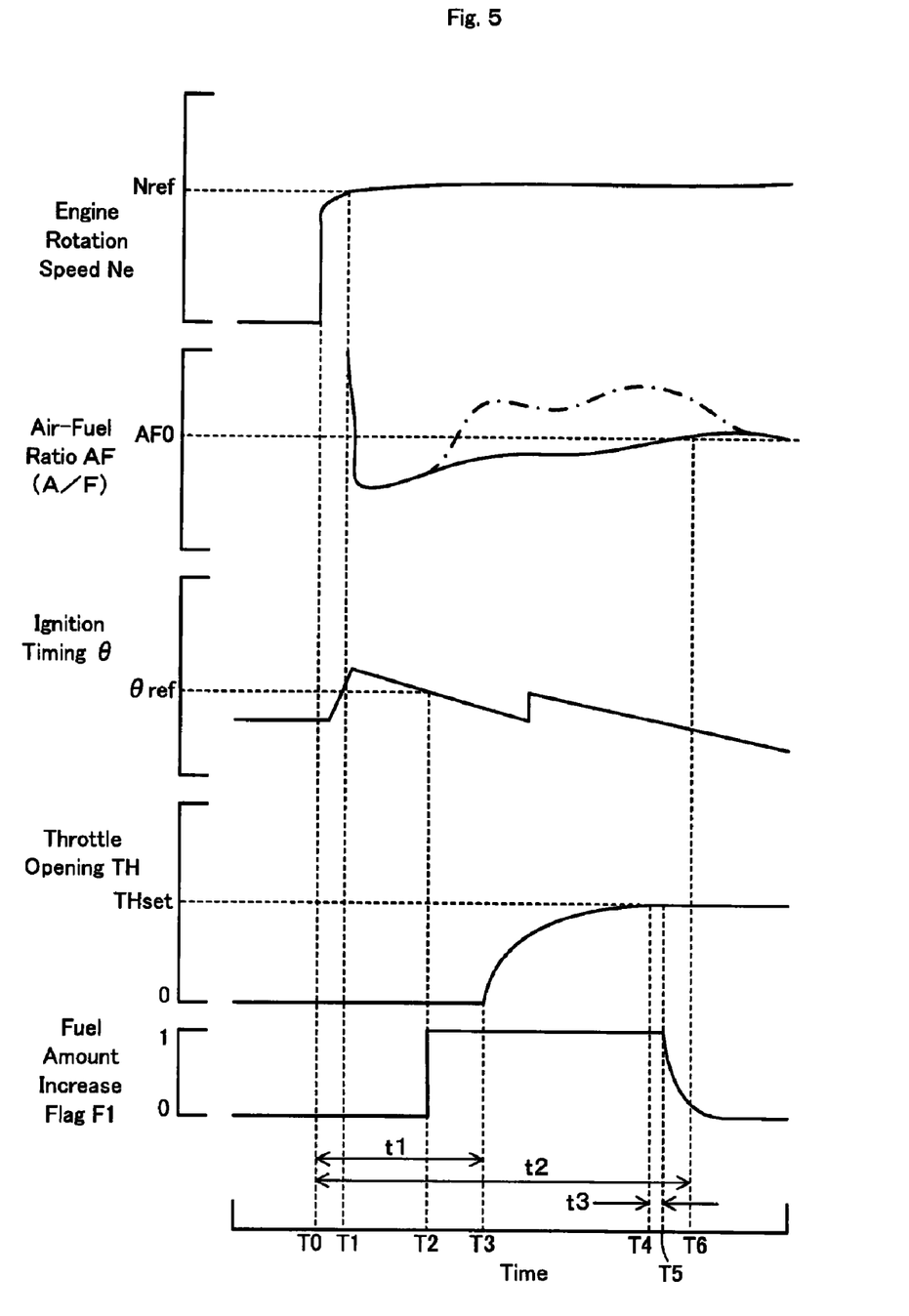
FIG. 5 is a time chart showing time variations of an engine rotation speed Ne, an air-fuel ratio AF, an ignition timing θ, a throttle opening TH, and a fuel amount increase flag F1 at a start of the engine.

FIG. 5 is a time chart showing time variations of the engine rotation speed Ne, the air-fuel ratio AF, the ignition timing θ, the throttle opening TH, and the fuel amount increase flag F1 at the start of the engine 22 according to the start control process of FIG. 3. In the graph of the air-fuel ratio AF, the solid line curve shows a variation in air-fuel ratio AF with the increase correction of the fuel injection amount according to the start control process of the embodiment, whereas the one dot-chain line curve shows a variation in air-fuel ratio AF without the increase correction of the fuel injection amount. At a time point T0, the motors MG1 and MG2 are controlled to start motoring the engine 22. At the start of engine motoring, the start control process reduces the throttle opening TH and regulates the ignition timing θ to the predetermined start ignition timing θst (step S100 in FIG. 3). The fuel injection control and the ignition control start at a time point T1 when the rotation speed Ne of the engine 22 reaches or exceeds the preset reference speed Nref (steps S110 to S130). After the start of the fuel injection control and the ignition control, the start control process starts gradually delaying the ignition timing θ (step S140). At a time point T2 when the ignition timing θ is delayed to or below the preset reference timing θref, the fuel amount increase flag F1 is set to 1 (steps S150 and S160). Because of the setting of 1 to the fuel amount increase flag F1 (step S340 in the fuel injection time setting routine of FIG. 4), the amount increase correction value TK is set to the specified amount increase time Tset (step S360). Such setting starts the increase correction of the fuel injection amount. In the absence of such increase correction of the fuel injection amount, the air-fuel ratio AF rises to the lean condition and increases the potential for a misfire. The start control procedure of this embodiment, however, executes the increase correction of the fuel injection amount. This keeps the air-fuel ratio AF in the slightly richer condition than the stoichiometric air-fuel ratio AF0 and thus effectively prevents the potential misfire. The increase correction of the fuel injection amount starting after the delay of the ignition timing θ to or below the preset reference timing θref significantly improves the fuel economy and the emission, compared with the increase correction of the fuel injection amount performed at an earlier timing. At a time point T3 when the preset time t1 has elapsed since the start of the engine 22, the start control process starts gradually increasing the reduced throttle opening TH to the preset target opening THset (steps S170 and S180). The ignition timing θ is simultaneously regulated to prevent the potential misfire. The increased throttle opening TH shifts the air-fuel ratio AF to the lean condition in the absence of the increase correction of the fuel injection amount. Execution of the increase correction of the fuel injection amount, however, keeps the air-fuel ratio AF in the slightly richer condition than the stoichiometric air-fuel ratio AF0 and thus effectively prevents the potential misfire. The gradually increasing throttle opening TH reaches the preset target opening THset at a time point T4. At a time point T5 when the preset time t3 has elapsed since the time point T4, the start control process resets the fuel amount increase flag F1 to 0 and sets the fuel amount increase termination flag F2 to 1 (steps S190 to S210). Such setting terminates the increase correction of the fuel injection amount. Namely the start control process of this embodiment quickly terminates the increase correction of the fuel injection amount at the time when the necessity of the increase correction disappears. At the termination timing of the increase correction of the fuel injection amount, the increase amount correction value TK is subjected to the smoothing process based on the air-fuel ratio AF. This desirably restrains a significant variation in air-fuel ratio AF accompanied with an abrupt change in amount of fuel injection, thus ensuring the stable fuel injection control. In order to show the degree of the smoothing process, the fuel amount increase flag F1, which is simply reset to 0 in the start control process, is shown to be smoothed to 0 in the time chart of FIG. 5. The delay of the ignition timing θ and the increase of the intake air flow are immediately cancelled in response to the driver's heavy depression of the accelerator pedal 83 during the catalyst warm-up control or in response to a significant increase of the vehicle speed V during the catalyst warm-up control to require the output power of the engine 22. Such cancellation does not allow the increase of the throttle opening TH to the preset target opening THset. In this case, the increase correction of the fuel injection amount is terminated at a time point T6 when the preset time t2 has elapsed since the start of the engine 22. This arrangement desirably prevents the increase correction of the fuel injection amount from being continued for a long time without requirement.

In the internal combustion engine control apparatus mounted on the hybrid vehicle 20 of the embodiment described above, at the first start of the engine 22 on the system activation, the ignition timing θ is delayed to accelerate the warm-up of the catalyst included in the catalytic converter 134. For the purpose of preventing the potential misfire, the increase correction of the fuel injection amount starts when the ignition timing θ is delayed to or below the preset reference timing θ. The increase correction of the fuel injection amount performed at this timing desirably improves the fuel economy and the emission, compared with the increase correction of the fuel injection amount performed at the start of delaying the ignition timing θ or at a slightly later timing than this start timing. The throttle opening TH is increased for accelerating the catalyst warm-up. The increase correction of the fuel injection amount is terminated after elapse of the preset time t3 since the increase of the throttle opening TH to the preset target opening THset. This arrangement quickly terminates the increase correction of the fuel injection amount at the time when the necessity of the increase correction disappears. The quick termination desirably prevents potential troubles, for example, the low fuel economy and the poor emission, caused by the excessive increase correction of the fuel injection amount. The catalyst warm-up control may be cancelled in response to a requirement of the output power of the engine 22. In this case, the increase correction of the fuel injection amount is terminated after elapse of the preset time t2 since the start of the engine 22. This arrangement desirably prevents the increase correction of the fuel injection amount from being continued for a long time without requirement. At the termination timing of the increase correction of the fuel injection amount, the increase amount correction value TK is subjected to the smoothing process based on the air-fuel ratio AF. This desirably restrains a significant variation in air-fuel ratio AF accompanied with an abrupt change in amount of fuel injection by termination of the increase correction of the fuel injection amount, thus ensuring the stable fuel injection control.

In the internal combustion engine control apparatus mounted on the hybrid vehicle 20 of the embodiment, the increase correction of the fuel injection amount starts when the ignition timing θ is delayed to or below the preset reference timing θ. The start of the increase correction is, however, not restricted to this timing. For example, the increase correction of the fuel injection amount may start after elapse of a predetermined time since the start of the engine 22. In another example, the increase correction of the fuel injection amount may start after elapse of a predetermined time since the start of the delay of the ignition timing θ.

In the internal combustion engine control apparatus mounted on the hybrid vehicle 20 of the embodiment, the increase correction of the fuel injection amount is terminated after elapse of the preset time t3 since the increase of the throttle opening TH to the preset target opening THset. The termination of the increase correction is, however, not restricted to this timing. For example, the increase correction of the fuel injection amount may be terminated when the increasing throttle opening TH reaches the preset target opening THset. In another example, the increase correction of the fuel injection amount may be terminated after elapse of a predetermined time since the start of the increase of the throttle opening TH.

In the internal combustion engine control apparatus mounted on the hybrid vehicle 20 of the embodiment, the increase of the throttle opening TH starts after the start of the delay of the ignition timing θ. The start of the increase of the throttle opening TH is, however, not restricted to this timing. For example, the increase of the throttle opening TH may start simultaneously with the start of the delay of the ignition timing θ.

In the internal combustion engine control apparatus mounted on the hybrid vehicle 20 of the embodiment, the catalyst warm-up is implemented by delaying the ignition timing θ and by increasing the throttle opening TH with a view to increasing the intake air flow Qa. This is, however, not restrictive. For example, the catalyst warm-up may be implemented by only delaying the ignition timing θ and without the increase of the throttle opening TH. In another example, the catalyst warm-up may be implemented by only increasing the throttle opening TH and without the delay of the ignition timing θ. In the former catalyst warm-up by only the delay of the ignition timing θ, the increase correction of the fuel injection amount is terminated after elapse of the preset time t2 since the start of the engine 22. In the latter catalyst warm-up by only the increase of the throttle opening TH, the increase correction of the fuel injection amount starts at the timing of starting the increase of the throttle opening TH or after elapse of a predetermined time since the start of the engine 22.

In the internal combustion engine control apparatus mounted on the hybrid vehicle 20 of the embodiment, in the case of cancellation of the catalyst warm-up control in response to a requirement of the output power of the engine 22, the increase correction of the fuel injection amount is terminated after elapse of the preset time t2 since the start of the engine 22. This is, however, not restrictive. The increase correction of the fuel injection amount may be terminated after elapse of the preset time t2 since the start of the engine 22, regardless of the requirement or no requirement of the output power of the engine 22. In this modified arrangement, the increase of the throttle opening TH may be omitted.

In the internal combustion engine control apparatus mounted on the hybrid vehicle 20 of the embodiment, on the termination of the increase correction of the fuel injection amount, the increase amount correction value TK is subjected to the smoothing process based on the air-fuel ratio AF. The smoothing process is, however, not essential, but any other suitable technique may be adopted to attenuate the increment of the fuel injection amount according to the air-fuel ratio AF. The increase correction of the fuel injection amount may be terminated immediately without attenuation of the increment of the fuel injection amount.

In the internal combustion engine control apparatus mounted on the hybrid vehicle 20 of the embodiment, the start control is performed to warm up the catalyst included in the catalytic converter 134 at the first start of the engine 22 on the system activation. The start control is, however, not restrictively performed on the occasion of the first start of the engine 22 on the system activation. The start control may also be performed on any subsequent start of the engine 22, as long as the warm-up of the catalyst included in the catalytic converter 134 is incomplete.

The above embodiment regards the internal combustion engine control apparatus mounted on the hybrid vehicle 20. The internal combustion engine control apparatus may also be mounted on a conventional automobile without a drive motor. In this application, for a quick response to a driving demand, it is preferable to omit the increase of the throttle opening TH and the resulting increase of the intake air flow Qa for the catalyst warm-up. The increase correction of the fuel injection amount is terminated after elapse of the preset time t2 since the start of the engine 22.

The internal combustion engine control apparatus of the invention may be mounted on any moving bodies including train vehicles and any other vehicles, as well as automobiles, ships and boats, and aircraft. The internal combustion engine control apparatus of the invention may otherwise be built in any stationary equipment.

The embodiment regards the internal combustion engine control apparatus mounted on the hybrid vehicle 20. The technique of the invention is not restricted to this control apparatus but may also be actualized by a corresponding control method of the internal combustion engine.

The embodiment discussed above is to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

INDUSTRIAL APPLICABILITY

The technique of the invention is preferably applicable to the manufacturing industries of internal combustion engine control apparatus and other relevant industries.

The invention claimed is:

1. An internal combustion engine control apparatus for controlling an internal combustion engine that has a variable ignition timing and is equipped with a catalytic converter, which is provided in an exhaust system and is filled with an emission control catalyst for catalytic conversion of exhaust from the internal combustion engine, the internal combustion engine control apparatus performing start-time ignition control to start gradually delaying the ignition timing immediately after a start of the internal combustion engine with the emission control catalyst in a non-warm-up state, the internal combustion engine control apparatus performing start-time fuel injection control, wherein until satisfaction of a predetermined amount increasing condition set in advance for prevention of a misfire during the gradual delay of the ignition timing by the start-time ignition control, the start-time fuel injection control regulates a fuel injection amount of a fuel injection valve to a specific amount of fuel injection for attaining a target air-fuel ratio, and after satisfaction of the predetermined amount increasing condition, the start-time fuel injection control starts an increase correction to the fuel injection amount by adding an increase amount correction value to the specific amount of fuel injection for attaining the target air-fuel ratio, wherein the internal combustion engine control apparatus performing start-time throttle control starts gradually increasing the throttle opening to a preset target opening after the start of the increase correction of the fuel injection amount by the start-time fuel injection control.

2. The internal combustion engine control apparatus in accordance with claim 1, wherein the predetermined amount increasing condition is that the ignition timing is delayed to a specific angle.

3. The internal combustion engine control apparatus in accordance with claim 1, wherein the predetermined amount increasing condition is that a preset time has elapsed since the start of the gradual delay of the ignition timing by the start-time ignition control.

4. The internal combustion engine control apparatus in accordance with claim 1, wherein the specific amount of fuel injection for attaining the target air-fuel ratio is computed by multiplying a base fuel injection amount for attaining a stoichiometric air-fuel ratio by a correction factor corresponding to an operating condition of the internal combustion engine.

5. The internal combustion engine control apparatus in accordance with claim 1,
wherein the start-time fuel injection control terminates the increase correction of the fuel injection amount after the increase of the throttle opening to the preset target opening by the start-time throttle control.

6. The internal combustion engine control apparatus in accordance with claim 5, wherein the start-time fuel injection control terminates the increase correction of the fuel injection amount after elapse of a predetermined time since the increase of the throttle opening to the preset target opening.

7. The internal combustion engine control apparatus in accordance with claim 5, wherein the start-time throttle control is cancelled in response to an output requirement to the internal combustion engine, and
the start-time fuel injection control terminates the increase correction of the fuel injection amount after elapse of a predetermined time since the start of the internal combustion engine, in the event of cancellation of the start-time throttle opening.

8. The internal combustion engine control apparatus in accordance with claim 1, wherein the start-time fuel injection control terminates the increase correction of the fuel injection amount after elapse of a predetermined time since the start of the internal combustion engine.

9. The internal combustion engine control apparatus in accordance with claim 5, wherein the start-time fuel injection control terminates the increase correction of the fuel injection amount with a degree of attenuation based on a latest air-fuel ratio immediately before the termination of the start-time fuel injection control.

10. A control method of internal combustion engine for controlling an internal combustion engine that has a variable ignition timing and is equipped with a catalytic converter, which is provided in an exhaust system and is filled with an emission control catalyst for catalytic conversion of exhaust from the internal combustion engine, the control method comprising the steps of:
performing start-time ignition control to start gradually delaying the ignition timing immediately after a start of the internal combustion engine with the emission control catalyst in a non-warm-up state;
just prior to performing the start-time ignition control, reducing a throttle opening of a throttle valve located in an air intake passage of the engine;
performing start-time fuel injection control to start gradually increasing the throttle opening to a preset target opening after the start of the increase correction of the fuel injection amount by the start-time fuel injection control;
regulating a fuel injection amount of a fuel injection valve to a specific amount of fuel injection for attaining a target air-fuel ratio until satisfaction of a predetermined amount increasing condition during the gradual delay of the ignition timing, the predetermined amount increasing condition being set in advance for prevention of a misfire; and
after satisfaction of the predetermined amount increasing condition, starting an increase correction to the fuel injection amount by adding an increase amount correction value to the specific amount of fuel injection for attaining the target air-fuel ratio, and also increasing the throttle opening to a preset target opening for catalyst warm-up.

11. The control method of the internal combustion engine in accordance with claim 10,
wherein the start-time fuel injection control terminates the increase correction of the fuel injection amount after the increase of the throttle opening to the preset target opening by the start-time throttle control.

12. The control method of the internal combustion engine in accordance with claim 10, further comprising terminating the increase correction of the fuel injection amount after elapse of a predetermined time since the start of the internal combustion engine.

13. The control method of the internal combustion engine in accordance with claim 11, further comprising terminating the increase correction of the fuel injection amount with a degree of attenuation based on a latest air-fuel ratio immediately before the termination of the start-time fuel injection control.

14. A control method of internal combustion engine for controlling an internal combustion engine that has a variable ignition timing and is equipped with a catalytic converter, which is provided in an exhaust system and is filled with an emission control catalyst for catalytic conversion of exhaust from the internal combustion engine,
the control method of the internal combustion engine performing start-time ignition control to start gradually delaying the ignition timing immediately after a start of the internal combustion engine with the emission control catalyst in a non-warm-up state,
the control method of the internal combustion engine performing start-time fuel injection control to start gradually increasing the throttle opening to a preset target opening after the start of the increase correction of the fuel injection amount by the start-time fuel injection control,
wherein until satisfaction of a predetermined amount increasing condition set in advance for prevention of a misfire during the gradual delay of the ignition timing by the start-time ignition control, the start-time fuel injection control regulates a fuel injection amount of a fuel injection valve to a specific amount of fuel injection for attaining a target air-fuel ratio, and
after satisfaction of the predetermined amount increasing condition, the start-time fuel injection control starts an increase correction to the fuel injection amount by adding an increase amount correction value to the specific amount of fuel injection for attaining the target air-fuel ratio.

15. The control method of the internal combustion engine in accordance with claim 14, wherein the start-time fuel injection control terminates the increase correction of the fuel injection amount after the increase of the throttle opening to the preset target opening by the start-time throttle control.

16. The control method of the internal combustion engine in accordance with claim 14, wherein the start-time fuel injection control terminates the increase correction of the fuel injection amount after elapse of a predetermined time since the start of the internal combustion engine.

17. The control method of the internal combustion engine in accordance with claim 14, wherein the start-time fuel injection control terminates the increase correction of the fuel injection amount with a degree of attenuation based on a latest air-fuel ratio immediately before the termination of the start-time fuel injection control.

* * * * *